United States Patent
Draznin et al.

(10) Patent No.: US 9,025,522 B2
(45) Date of Patent: May 5, 2015

(54) PROVIDING NETWORK CONNECTIVITY BASED ON DEVICE MOBILITY

(75) Inventors: Sagiv Draznin, Walnut Creek, CA (US); Patricia Ruey-Jane Chang, San Ramon, CA (US); Lalit R. Kotecha, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 462 days.

(21) Appl. No.: 13/469,896

(22) Filed: May 11, 2012

(65) Prior Publication Data

US 2013/0301540 A1 Nov. 14, 2013

(51) Int. Cl.
*H04W 4/00* (2009.01)
*H04W 76/02* (2009.01)
*H04W 8/22* (2009.01)

(52) U.S. Cl.
CPC .............. *H04W 76/022* (2013.01); *H04W 8/22* (2013.01)

(58) Field of Classification Search
USPC .......... 370/252, 254, 230, 236, 328, 329, 331
See application file for complete search history.

(56) References Cited

U.S. PATENT DOCUMENTS

| | | | |
|---|---|---|---|
| 2009/0285179 A1* | 11/2009 | Jones et al. | 370/331 |
| 2012/0076047 A1* | 3/2012 | Turanyi et al. | 370/254 |
| 2012/0128084 A1* | 5/2012 | Aguirre et al. | 375/260 |
| 2013/0003656 A1* | 1/2013 | Cho et al. | 370/328 |
| 2013/0059582 A1* | 3/2013 | Del Signore | 455/435.1 |
| 2013/0208661 A1* | 8/2013 | Nylander et al. | 370/328 |

* cited by examiner

*Primary Examiner* — Kwang B Yao
*Assistant Examiner* — Nguyen Ngo (57) ABSTRACT

A device receives an attachment request from a user device, and determines whether the user device is a stationary device based on the attachment request. The device further establishes a connection between the user device and a network by using local components associated with the device when the user device is the stationary device. The local components perform functions performed by one or more of a remote mobility management entity (MME) device, a remote serving gateway (SGW), or a remote packet data network (PDN) gateway (PGW) associated with the device. The device also transmits data from the network to the user device via the local components associated with the device after establishing the connection between the user device and the network.

20 Claims, 9 Drawing Sheets

PROVIDING NETWORK CONNECTIVITY BASED ON DEVICE MOBILITY

BACKGROUND

Mobile devices are continuing to increase in popularity, and are replacing landline telephones. Thus, some mobile devices may only be used in fixed locations. Such mobile devices may be considered stationary devices since they do not move between different locations while being used. Other stationary devices, such as Machine-to-machine (M2M) devices (e.g., a soda machine), telemetry (e.g., sensors), etc. may also use wireless telecommunication technology devices to communicate with other devices. Mobile devices and the other stationary devices may access wireless communication services via a network, such as a cellular network. These devices connect to the network via a base station, such as an evolved Node B (eNB), when the devices are within a geographic area associated with the base station. Currently, base stations connect devices to the network in the same manner regardless of whether the devices are mobile devices or stationary (i.e., non-mobile) devices. As a result, even stationary devices are connected to the network via network resources that are remote/apart from the base stations. Such an arrangement needlessly increases latency experienced by users of the network, and wastes network resources.

DETAILED DESCRIPTION OF PREFERRED EMBODIMENTS

The following detailed description refers to the accompanying drawings. The same reference numbers in different drawings may identify the same or similar elements.

Figure 1:
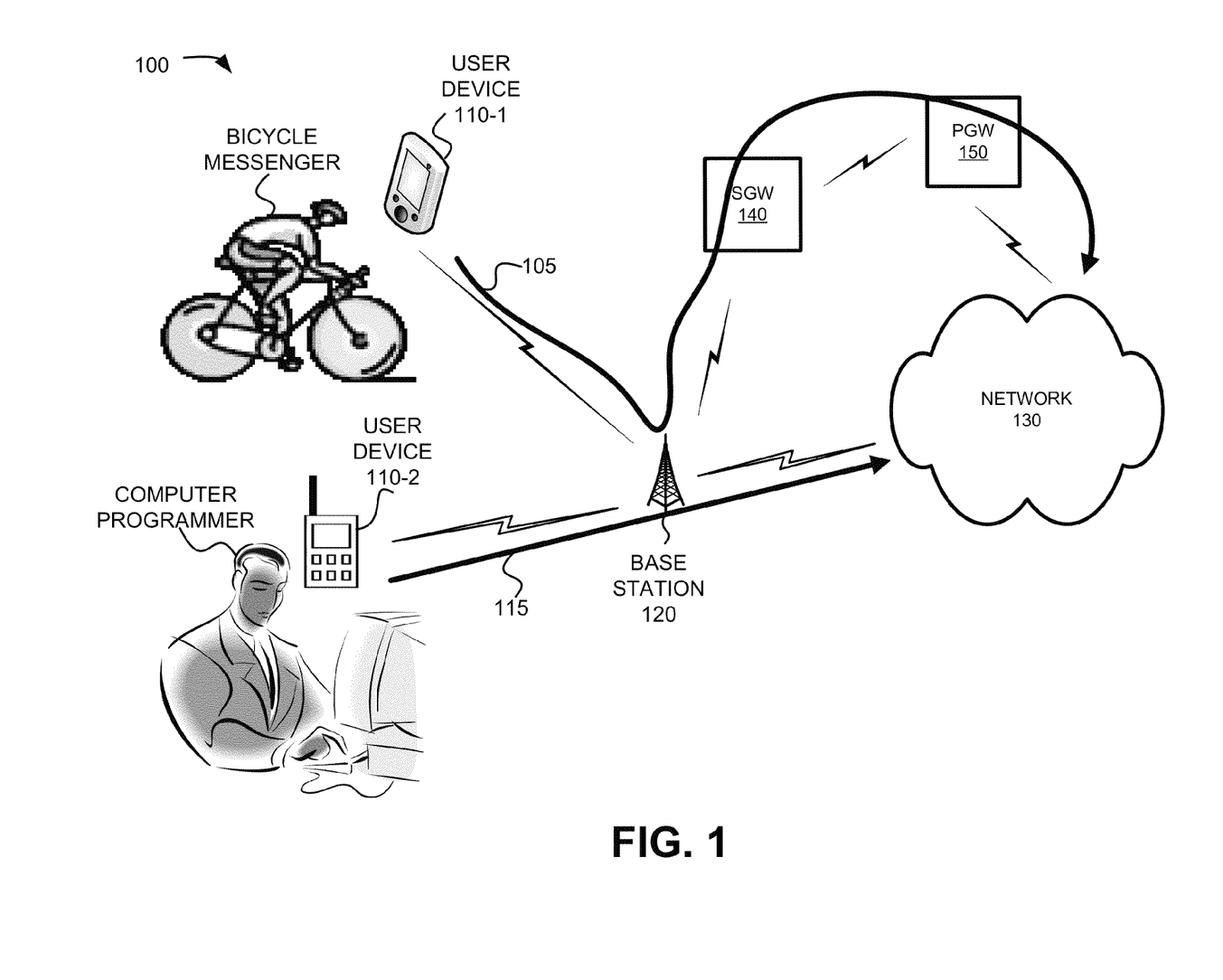
FIG. 1 is a diagram that illustrates an overview of an example implementation described herein.

FIG. 1 is a diagram that illustrates an overview 100 of an example implementation described herein. As shown in FIG. 1, a portion of a network may include user devices 110, a base station 120, a network 130, a remote serving gateway (SGW) 140, and a remote packet data network (PDN) gateway (PGW) 150. A remote mobility management entity (MME) device (not shown in FIG. 1), remote SGW 140, and/or remote PGW 150 may be remote when they are more than a particular distance away from base station 120, are separated from base station 120 by one or more other network devices, and/or are associated with a plurality of base stations that include base station 120. Base station 120 may not be directly connected to the remote MME device, remote SGW 140, and/or remote PGW 150.

Assume that a bicycle messenger acquires a user device 110-1 to use while making deliveries between different locations. User device 110-1 may store information that indicates that user device 110-1 is used in a mobile manner (i.e., is a mobile device rather than a stationary device). When the bicycle messenger initializes user device 110-1, user device 110-1 may generate an attachment request that includes an indicator that indicates that user device 110-1 is not stationary, and may transmit the attachment request to base station 120. Base station 120 may receive the attachment request, and may determine that user device 110-1 is not stationary based on the indicator in the attachment request. Accordingly, thereafter, base station 120 may create a connection 105 from user device 110-1 to network 130 via the remote MME device (not shown in FIG. 1), remote SGW 140 (herein "SGW 140"), and remote PGW 150 (herein "PGW 140"). User device 110-1 may use connection 105 to transmit data to and/or receive data from network 130.

In contrast, further assume that a computer programmer acquires a user device 110-2 to only use while in a single location (e.g., sitting in his office). User device 110-2 may store information that indicates that user device 110-2 is a stationary device. When the computer programmer initializes user device 110-2, user device 110-2 may generate an attachment request that includes an indicator that indicates that user device 110-2 is stationary, and may transmit the attachment request to base station 120. Base station 120 may receive the attachment request, and may determine that user device 110-2 is a stationary device based on the indicator in the attachment request. Instead of connecting user device 110-2 to network 130 via the remote MME device, SGW 140, and PGW 150, base station 120 may use local components associated with base station 120 to create a connection 115 from user device 110-2 to network 130. The local components may include, for example, functional components included in base station 120 and/or in one or more devices directly connected to base station 120.

User device 110-2 may use connection 115 to transmit data to and/or receive data from network 130. As a result, the computer programmer may not have to wait for a connection to be established via the remote MME device, SGW 140, and PGW 150 because the local components associated with base station 120 may be used to establish connection 115. Furthermore, processing resources of the remote MME device, SGW 140, and PGW 140 may not unnecessarily be used to facilitate a connection for user device 110-2.

Figure 2:
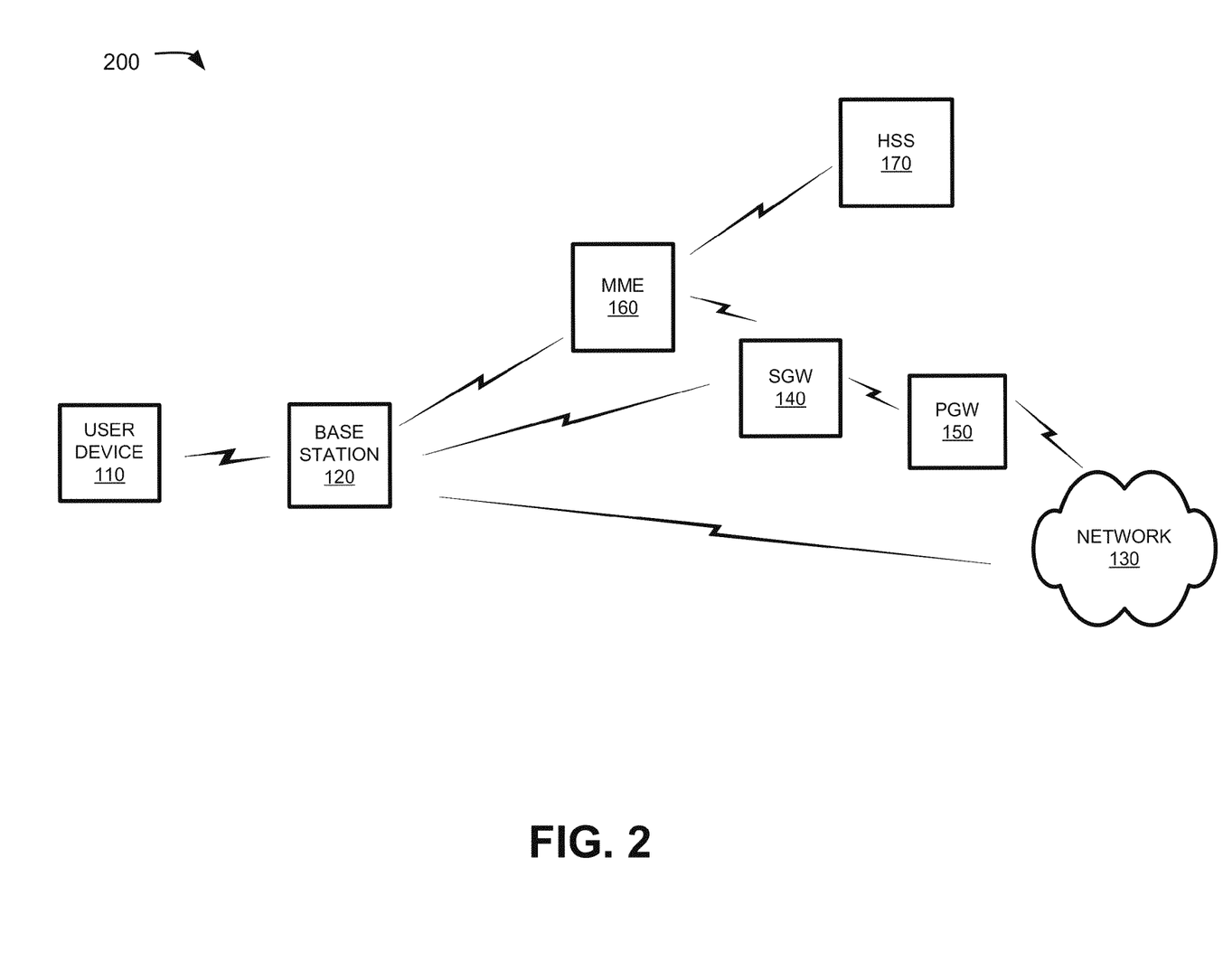
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 110, base station 120, network 130, SGW 140, PGW 150, a MME device 160, and a home subscriber server (HSS) 170. A single user device 110, base station 120, network 130, SGW 140, PGW 150, MME device 160, and HSS 170 have been illustrated in FIG. 1 for simplicity. In practice, there may be more user devices 110, base stations 120, networks 130, SGWs 140, PGWs 150, MME devices 160, and/or HSSs 170.

In one implementation, environment 200 may include an evolved packet system (EPS) that includes a long term evolution (LTE) network and/or an evolved packet core (EPC) network that operate based on a third generation partnership project (3GPP) wireless communication standard. The LTE network may be a radio access network (RAN) that includes one or more base stations 120, such as evolved Node Bs (eNBs), via which user device 110 communicates with the EPC network. The EPC network may include SGWs 140, PGWs 150, and/or MME devices 160 that enable user device 110 to communicate with network 130 and/or an Internet protocol (IP) multimedia subsystem (IMS) core network. The IMS core network may include HSS 170, and may manage authentication, session initiation, account information, profile information, etc. associated with user devices 110.

User device 110 may include a device that is capable of communicating with base station 120. For example, in some implementations, user device 110 may include a mobile communication device, such as a radiotelephone; a personal communications system (PCS) terminal that may, for example, combine a cellular radiotelephone with data processing and data communications capabilities; a personal digital assistant (PDA) that can include, for example, a radiotelephone, a pager, Internet/intranet access, etc.; a wireless device; a smart phone; a tablet computer; a laptop computer with a wireless air card; a global positioning system (GPS) device; a content recording device (e.g., a camera, a video camera, etc.); a voice over Internet protocol (VoIP) device; an analog terminal adaptor (ATA); etc. In some implementations user device 110 may include a M2M device, a telemetry device, or another type of device. In some implementations, user device 110 may store information that indicates whether user device 110 is a mobile device or is a non-mobile or stationary device. User device 110 may communication with other user devices 110 via network 130.

Base station 120 may include one or more devices that receive, process, and/or transmit traffic, such as voice, video, text, and/or other data destined for and/or received from user device 110. Base station 120 may combine the functionalities of a base station and/or a radio network controller (RNC) in second generation (2G) or third generation (3G) radio access networks. In some implementations, base station 120 may be an eNB (e.g., associated with the LTE network) that receives traffic from and/or sends traffic to network 130. In other implementations, base station 120 may be a wireless access point (WAP) and/or another analogous type of device. Base station 120 may send traffic to and/or receive traffic from user device 110 via an air interface. In some implementations, as described further below with reference to FIG. 3, base station 120 may perform functions similar to functions performed by other remote network resources, such as SGW 140, PGW 150, MME device 160, and/or HSS 170. Additionally, or alternatively, base station 120 may be directly connected to one or more local devices that perform functions similar to functions performed by the remote network resources.

Network 130 may include one or more wired and/or wireless networks. For example, network 130 may include a cellular network, a public land mobile network (PLMN), a second generation (2G) network, a third generation (3G) network, a fourth generation (4G) network, a fifth generation (5G) network, and/or another network. Additionally, or alternatively, network 130 may include a wide area network (WAN), a metropolitan network (MAN), an ad hoc network, an intranet, the Internet, a fiber optic-based network, and/or a combination of these or other types of networks. Additionally, or alternatively, network 130 may include, or connect to, an external IP network.

SGW 140 may include one or more devices that gather, process, search, store, and/or provide information in a manner described herein. In one implementation, SGW 140 may, for example, aggregate traffic received from one or more base stations 120, and may send the aggregated traffic to network 130 (e.g., via PGW 150) and/or other devices associated with the EPC network. SGW 140 may also receive traffic from network 130 and/or the other devices, and may send the received traffic to user device 110 via base station 120.

PGW 150 may include one or more devices that gather, process, search, store, and/or provide information in a manner described herein. In one example implementation, PGW 150 may include a device that aggregates traffic received from one or more SGWs 140, and may send the aggregated traffic to network 130. Alternatively, or additionally, PGW 150 may receive traffic from network 130, and may send the traffic to user device 110 via SGW 140 and base station 120.

MME device 160 may include one or more devices that gather, process, search, store, and/or provide information in a manner described herein. In one implementation, MME device 160 may provide control plane processing for the EPC network of environment 200. For example, MME device 160 may implement tracking and paging procedures for user device 110, may activate and deactivate bearers for user device 110, may authenticate a user of user device 110, and may interface with non-LTE radio access networks. In some implementations, MME device 160 may determine whether user device 110 is a mobile device or a stationary device.

HSS 170 may include one or more devices that gather, process, search, store, and/or provide information in a manner described herein. For example, HSS 170 may manage, update, and/or store, in a memory associated with HSS 170, profile information, associated with user device 110. The profile information may identify applications and/or services that are permitted for and/or accessible by user device 110; information associated with a user of user device 110 (e.g., a username, a password, a personal identification number (PIN), etc.); and/or other information. Additionally, or alternatively, HSS 170 may perform authentication, authorization, and/or accounting (AAA) operations associated with a communication session with user device 110. In some implementations, HSS 170 may store information regarding which user devices 110 are stationary (i.e., non-mobile) devices and which user devices are not stationary devices (i.e., used in a mobile manner). HSS 170 may receive a request for a status of user device 110 from MME device 160. The request for the status may inquire as to whether user device 110 is a mobile device or a stationary device. HSS 170 may determine the status of user device 110 based on an access point name (APN) and/or an identifier (e.g., an international mobile subscriber identifier (IMSI)) associated with user device 110. The APN may include a network identifier and/or an operator identifier. The network identifier may define an external network (e.g., Internet) to which the user device 110 is connected, and the operatory identifier may include an identifier of an operator (e.g., a name of a cellular phone company) associated with the user device.

Although FIG. 2 shows example devices/networks of environment 200, in other implementations, environment 200 may include fewer devices/networks, different devices/networks, differently arranged devices/networks, and/or additional devices/networks than depicted in FIG. 2. Alternatively, or additionally, one or more devices of environment 200 may perform one or more tasks described as being performed by one or more other devices of environment 200.

Figure 3:
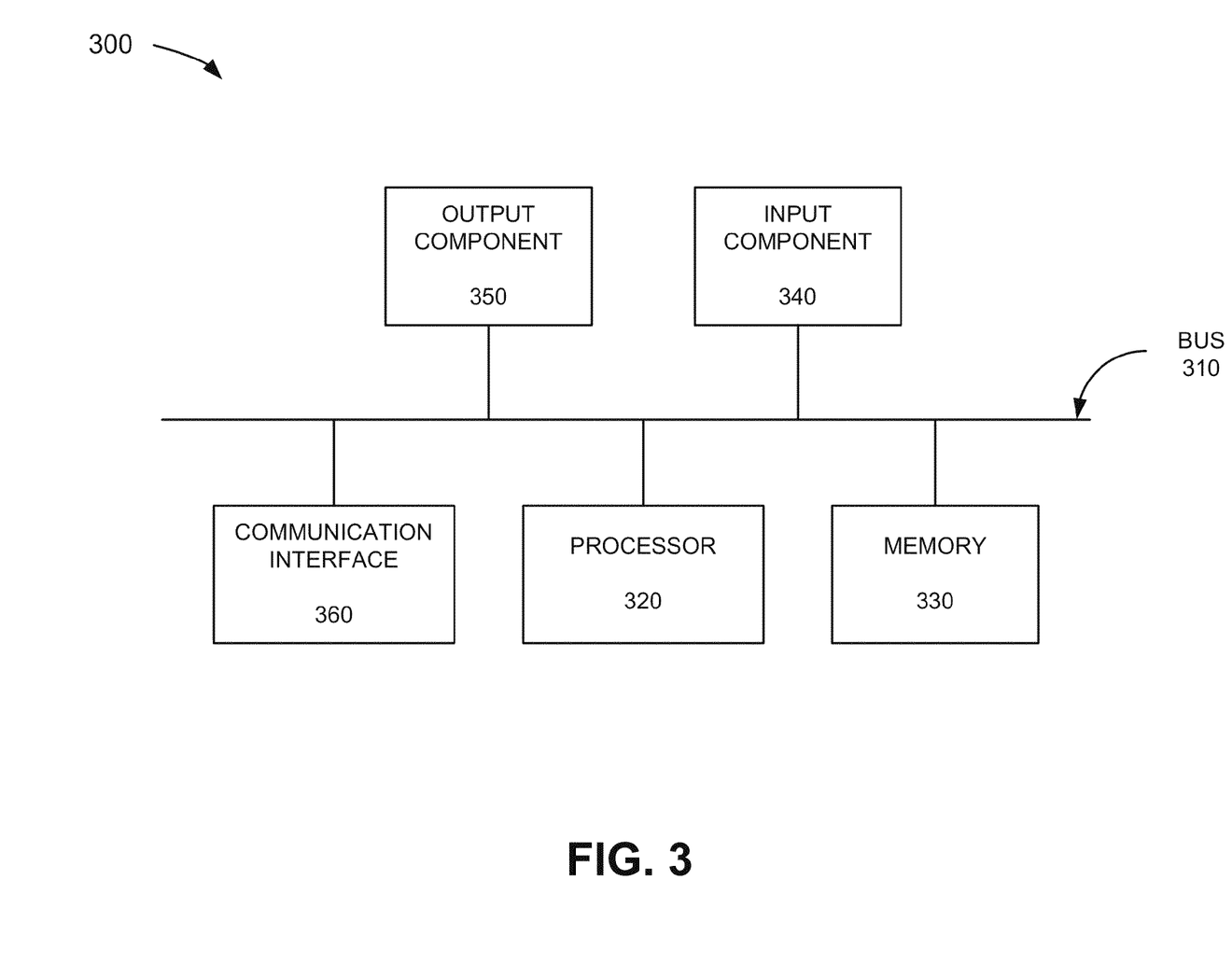
FIG. 3 is a diagram of example components of one or more devices of FIG. 2.

FIG. 3 is a diagram of example components of a device 300 that may correspond to user device 110, base station 120, SGW 140, PGW 150, MME device 160, and/or HSS 170. Alternatively, each of user device 110, base station 120, SGW 140, PGW 150, MME device 160, and/or HSS 170 may include one or more devices 300 and/or one or more components of device 300.

As shown in FIG. 3, device 300 may include a bus 310, a processor 320, a memory 330, an input component 340, an output component 350, and a communication interface 360. Although FIG. 3 shows example components of device 300, in other implementations, device 300 may contain fewer components, additional components, different components, and/ or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include any mechanism that allows a user to input information to device 300, such as a keyboard, a keypad, a mouse, a pen, a biometric mechanism, such as a voice recognition device, a touch screen, etc. Output component 350 may include a mechanism that outputs information to the user, such as a display, a speaker, etc.

Communication interface 360 may include any transceiver-like mechanism that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as network 130. In some implementations, communication interface 360 may be a logical component that includes input and output ports, input and output systems, and/or other input and output components that facilitate the transmission of data to other devices.

As described herein, device 300 may perform processes in response to processor 320 executing software instructions (e.g., computer program(s)) contained in a computer-readable medium, such as memory 330 or a secondary storage device (e.g., hard disk, CD-ROM, etc.). A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
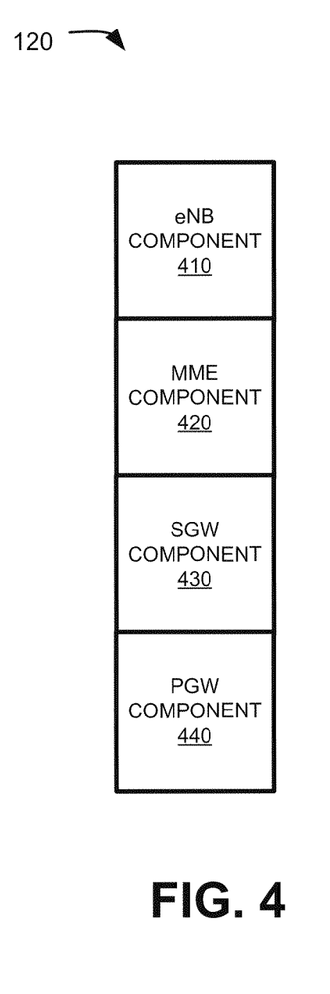
FIG. 4 is a diagram of example functional components of a base station of FIG. 2.

FIG. 4 is a diagram of example functional components of base station 120. As shown in FIG. 4, base station 120 may include an eNB component 410, a MME component 420, a SGW component 430, and/or a PGW component 440. Although FIG. 4 shows example functional components of base station 120, in other implementations, base station 120 may contain fewer functional components, additional functional components, different functional components, and/or differently arranged functional components than depicted in FIG. 4. Additionally, or alternatively, one or more functional components illustrated in FIG. 4 may perform one or more tasks described as being performed by one or more other functional components of FIG. 4. In some implementations, the functions described in connection with FIG. 4 may be performed by one or more components of device 300 (FIG. 3) or by one or more devices 300.

eNB component 410, MME component 420, SGW component 430, and PGW component 440 may perform functions similar to functions performed by base station 120, MME device 160, SGW 140, and PGW 150, respectively. eNB component 410, MME component 420, SGW component 430, and PGW component 440 may perform these functions to establish a connection between user device 110 and network 130 after base station 120 determines that user device 110 is a stationary device.

For example, eNB component 410 may combine the functionalities of a base station and/or a RNC. eNB component 410 send traffic to and/or receive traffic from user device 110 via an air interface. eNB component 410 may also determine whether user device 110 is stationary. eNB component 410 may use MME component 420 to establish a connection for user device 110 when user device is stationary, and eNB component 410 may use MME device 160 when user device 120 is not stationary.

In some implementations, MME component 420 may provide control plane processing for the EPC network of environment 200. Additionally, or alternatively, MME component 420 may also implement tracking and paging procedures for user device 110, may activate and deactivate bearers for user device 110, may authenticate a user of user device 110, and may interface with non-LTE radio access networks.

SGW component 430 may, for example, aggregate traffic received from eNB component 410, and may send the aggregated traffic to PGW component 440. SGW component 430 may also receive traffic from network 130 and/or the other devices, and may send the received traffic to user device 110 via eNB component 410.

PGW component 440 may, for example, aggregate traffic received from SGW component 430, and may send the aggregated traffic to network 130. Alternatively, or additionally, PGW component 440 may receive traffic from network 130, and may send the traffic to user device 110 via SGW component 430 and eNB component 410.

Figure 5A:
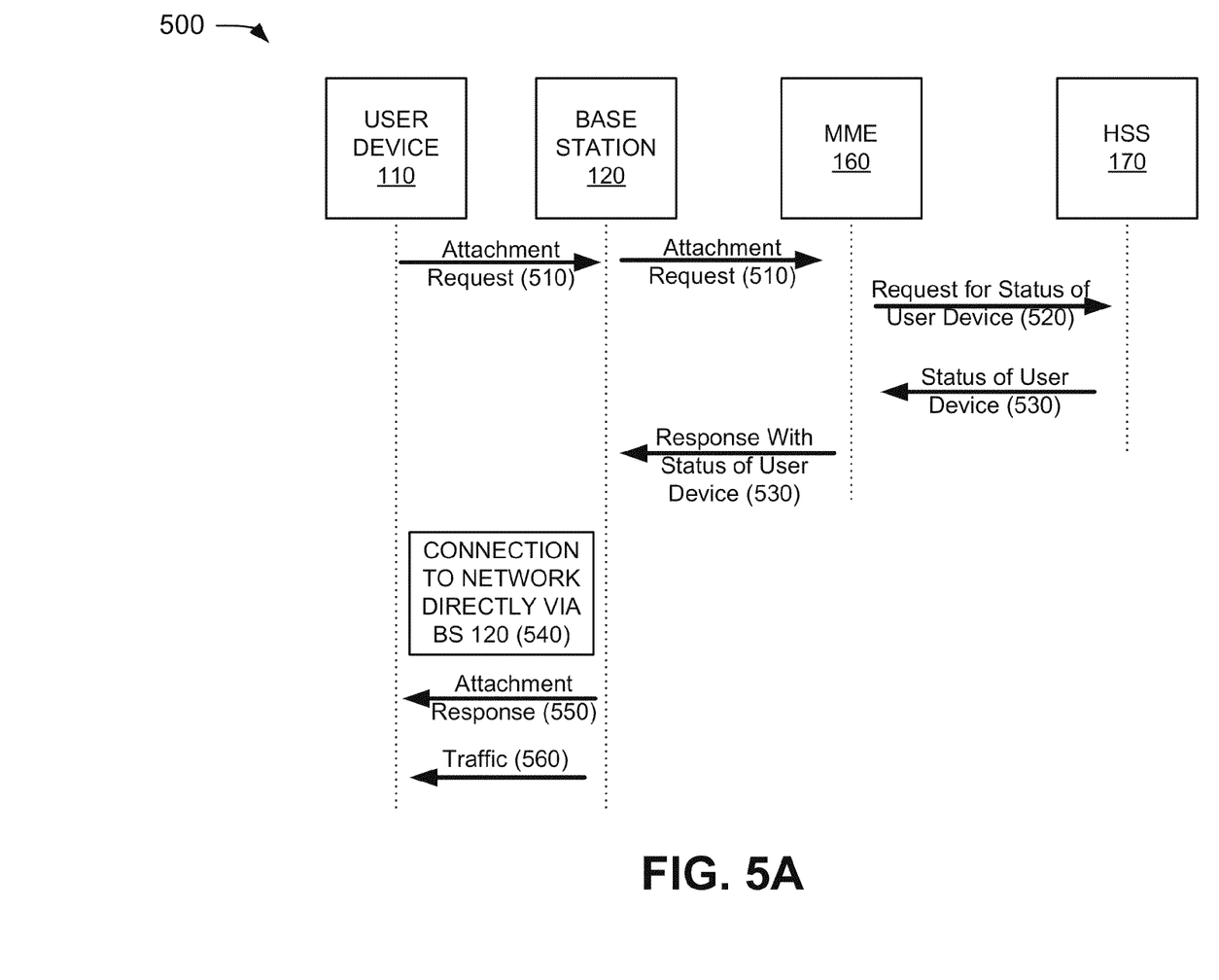
FIGS. 5A and 5B are flow diagrams of example operations capable of being performed by example portions of the environment in FIG. 2.

FIG. 5A is a flow diagram of example operations capable of being performed by an example portion 500 of environment 200. As shown in FIG. 5A, portion 500 may include user device 110, base station 120, MME device 160, and HSS 170. User device 110, base station 120, MME device 160, and HSS 170 may include the features described above in connection with, for example, one or more of FIGS. 1-4.

As further shown in FIG. 5A, when a user initializes user device 110, user device 110 may transmit an attachment request 510 to base station 120 in order to attach to a network (e.g., network 130) associated with base station 120. Attachment request 510 may include information associated with user device 110, such as an IMSI, a mobile equipment identifier (MEID), an APN, etc. In some implementations, attachment request 510 may include an indicator that indicates whether user device 110 is a mobile device or is a stationary device, as described further below with reference to FIG. 5B. Assume, for the example shown in FIG. 5A, that attachment request 510 does not include the indicator.

Base station 120 may receive attachment request 510, and may forward attachment request 510 to MME device 160 after determining that the attachment request 510 does not include the indicator. MME device 130 may receive attachment request 510, and may generate a request 520 for a status of user device 110, based on receiving attachment request 510. Request 520 may include the APN and/or an identifier (e.g., the IMSI) associated with user device 110. MME device 130 may transmit request 520 to HSS 170. HSS 170 may receive request 520, and may determine, based on request 520, whether user device 110 is a mobile device or is a stationary device based on information (e.g., stored in HSS 170) that is associated with the APN and/or the identifier associated with user device 110. Assume that HSS 170 determines that user device 110 is a stationary device based on the information stored in HSS 170.

HSS 170 may transmit, to MME device 160, a response 530 that includes a status of user device 110. The status may include information that indicates that user device 110 is a stationary device. MME device 160 may receive response 530, and may forward response 530 to base station 120 after determining that response 530 indicates that user device 110 is a stationary device.

Base station 120 may receive response 530, and may determine that user device 110 is a stationary device based on the information included in response 530. After determining that user device 110 is a stationary device, base station 120 may use local components associated base station 120 (e.g., described above in FIG. 4) to establish a connection 540 between user device 110 and network 130 (not shown in FIG. 5A) instead of establishing a connection via MME device 160, SGW 140, and PGW 150 (not shown in FIG. 5A). In some implementations, base station 120 may generate an attachment response 550, and may transmit attachment response 550 to user device 110 while or after establishing connection 540. Attachment response 550 may indicate that user device 110 is attached to network 130, that connection 540 is established, and/or that traffic 560 is ready to be transmitted to/from user device 110 via connection 540. Base station 120 may transmit traffic 560 from network 130 to user device 110 directly via the local components associated with base station 120.

Figure 5B:
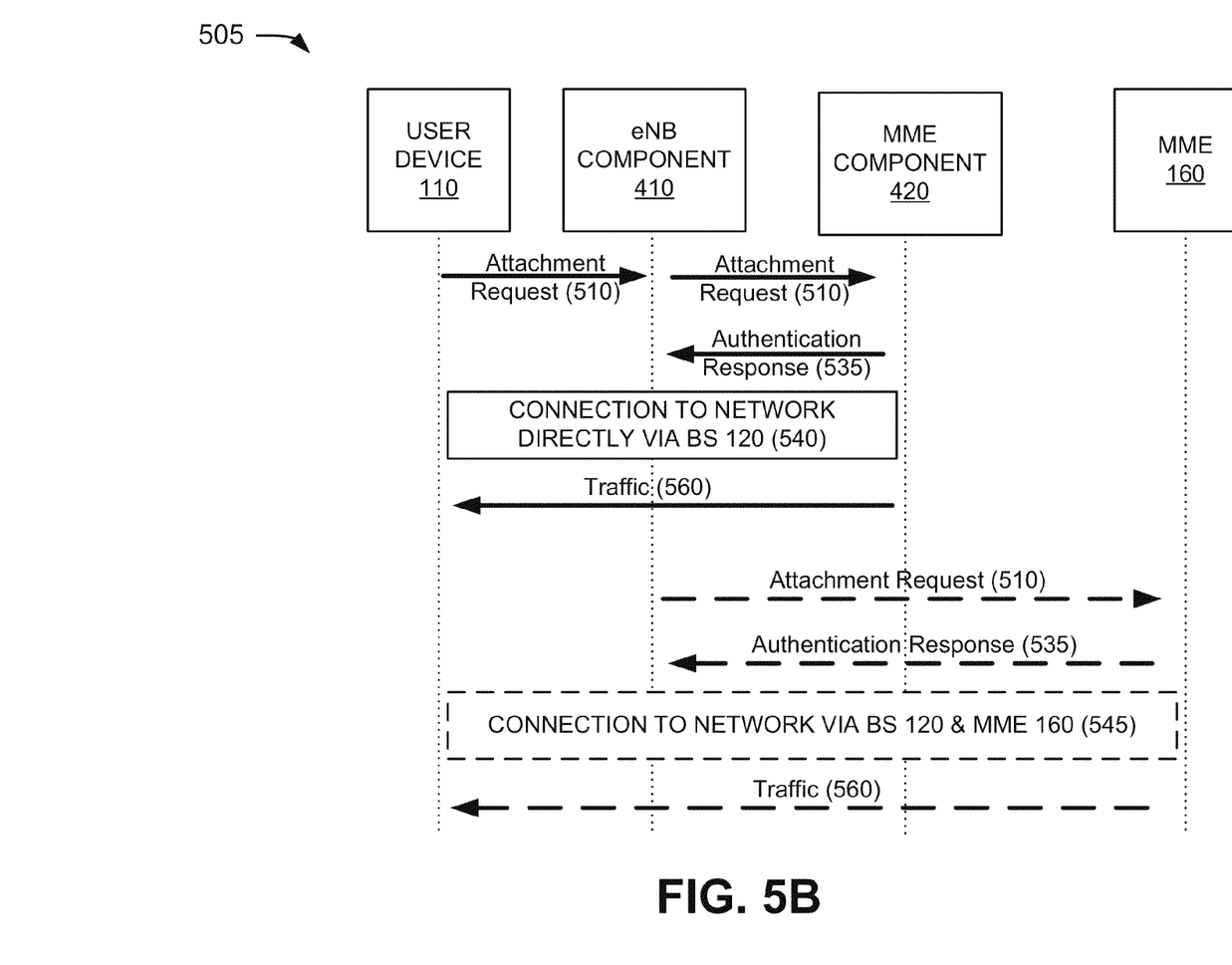

FIG. 5B is a flow diagram of other example operations capable of being performed by another example portion 505 of environment 200. As shown in FIG. 5B, portion 505 may include user device 110, eNB component 410, MME component 420, and MME device 160. User device 110, eNB component 410, MME component 420, and MME device 160 may include the features described above in connection with, for example, one or more of FIGS. 1-5A.

Assume that, in an example shown in FIG. 5B, user device 110 may store information that indicates whether user device 110 is stationary or mobile. In one implementation, a retailer and/or a service provider may store the information in user device 110 when a user of user device 110 acquires user device 110 from the retailer and/or the service provider. In another implementation, the user, of user device 110, may configure/change setting(s) of user device 110 for user device 110 to store the information that indicates whether user device 110 is stationary or mobile. In yet another implementation, the service provider may remotely configure/change setting(s) of user device 110 for user device 110 to store the information that indicates whether user device 110 is stationary or mobile. The service provider may remotely configure/change setting(s) of user device 110 based on (e.g., in response to) information provided by/received from user device 110 and/or the user of user device 110 (e.g., after the user switches to a new type of service plan).

As further shown in FIG. 5B, when a user initializes user device 110, user device 110 may determine whether user device 110 stores the information that indicates whether user device 110 is stationary or mobile. When user device 110 determines that user device 110 stores the information that indicates whether user device 110 is stationary or mobile, user device 110 may generate attachment request 510 that includes an indicator that indicates whether user device 110 is stationary or mobile. User device 110 may transmit attachment request 510 to eNB component 410 of base station 120.

eNB component 410 may receive attachment request 510, and may determine that attachment request 510 includes the indicator that indicates whether user device 110 is stationary or mobile. Thereafter, eNB component 410 may determine whether the indicator matches a first particular identifier (e.g., 0) or a second particular identifier (e.g., 1).

When eNB component 410 determines that the indicator matches the first particular identifier, eNB component 410 may determine that user device 110 is stationary, and may forward attachment request 510 to MME component 420 of base station 120. MME component 420 may authenticate user device 110 based on information included in attachment request 510. After MME component 420 authenticates user device 110, MME component 420 may generate and transmit an authentication response 535 to eNB component 410. Authentication response 535 may include information that is similar to information included in response 530 (FIG. 5A), except authentication response 535 may not include the status of user device 110. When eNB component 410 receives authentication response 535, connection 540 may be established between user device 110 and network 130 via eNB component 410 and MME component 420 of base station 120. eNB component 410 may use connection 540 to transmit traffic 560 from network 130 to user device 110 directly via eNB component 410, MME component 420, and/or other local components associated with base station 120.

Alternatively, as further shown in FIG. 5B, when eNB component 410 determines that the indicator matches the second particular identifier, eNB component 410 may determine that user device 110 is mobile, and may forward attachment request 510 to remote MME 160. MME 160 may authenticate user device 110 based on the information included in attachment request 510. After MME 160 authenticates user device 110, MME 160 may generate and transmit authentication response 535 to eNB component 410. When eNB component 410 receives authentication response 535, connection 545 may be established between user device 110 and network 130 via eNB component 410 and MME 160. eNB component 410 may use connection 545 to transmit traffic 560 from network 130 to user device 110 via eNB component 410, MME 160, and/or other remote network components (e.g., SGW 140 and PGW 150).

Figure 6:
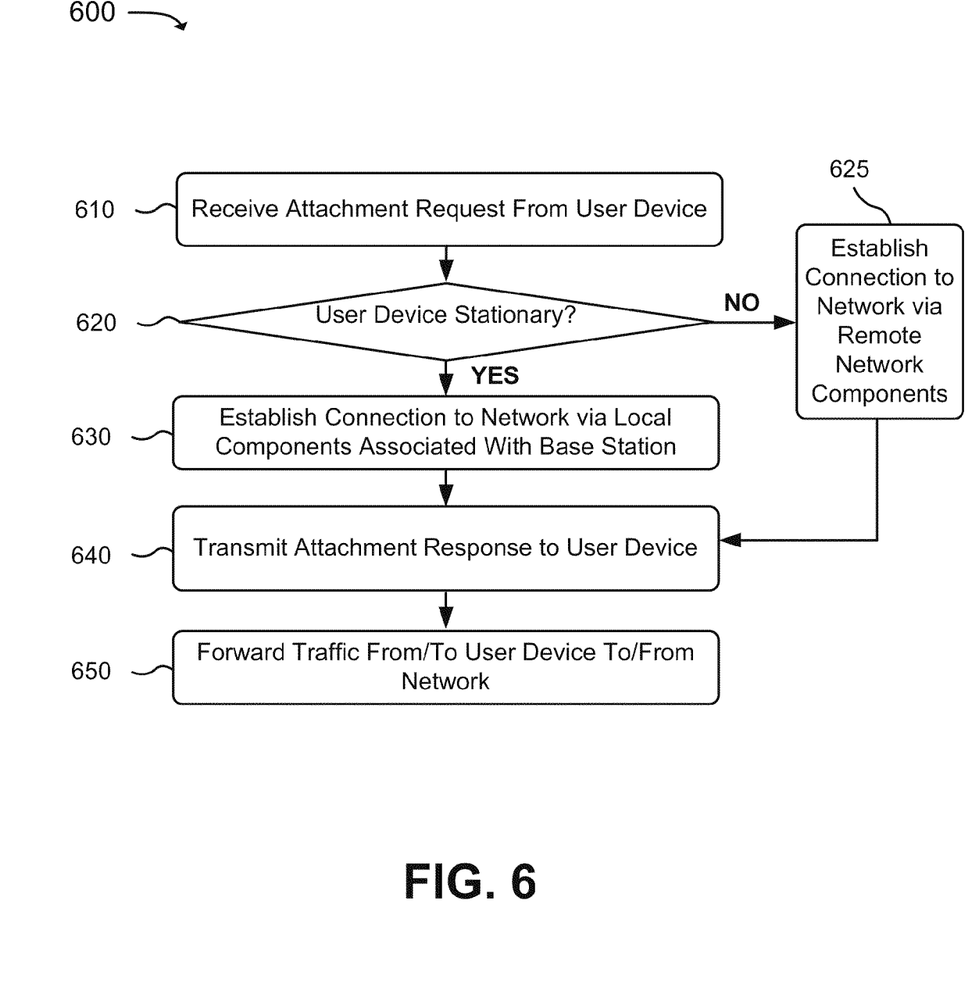
FIG. 6 is a flow chart of an example process for connecting a user device to a network.

FIG. 6 is a flow chart of an example process 600 for connecting a user device to a network. In one implementation, process 600 may be performed by base station 120. Alternatively, or additionally, some or all of process 600 may be performed by another device or group of devices, including or excluding base station 120.

As shown in FIG. 6, process 600 may include receiving an attachment request from a user device (block 610). For example, base station 120 may receive attachment request 510 (FIG. 5A or FIG. 5B) from user device 110. Attachment request 510 may include a request to attach to a network associated with base station 120, an APN and/or an identifier associated with user device 110, and/or an indicator, described further below.

Figure 7:
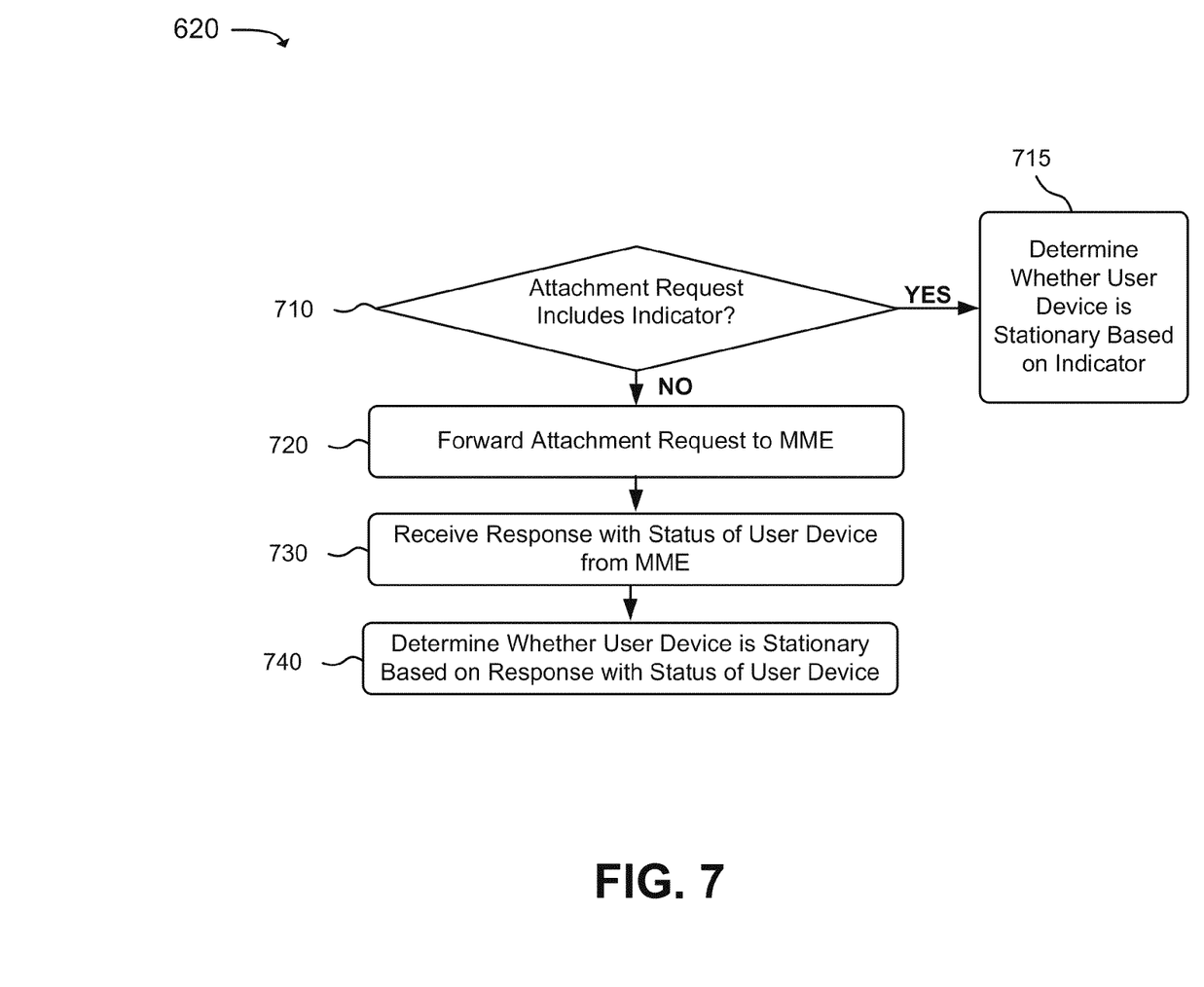
FIG. 7 is a flow chart of an example process for determining whether the user device is stationary.

Process 600 may further include determining whether the user device is stationary based on the attachment request (block 620). In one example implementation, process block 620 may include the process blocks depicted in FIG. 7. As shown in FIG. 7, process block 620 may include determining whether the attachment request includes the indicator (block 710). For example, base station 120 may determine whether attachment request 510 includes the indicator, which indicates whether user device 110 is a mobile device or a stationary device.

If the attachment request includes the indicator (block 710—YES), process block 620 may include determining whether the user device is stationary based on the indicator (block 715). For example, when base station 120 determines that attachment request 510 includes the indicator, base station 120 may determine whether user device 110 is a stationary device based on the indicator. In one example, when the indicator matches a first predefined identifier (e.g., 0 or "STATIONARY"), base station 120 may determine that user device 110 is a stationary device. And, when the indicator matches a second predefined identifier (e.g., 1 or "MOBILE"), base station 120 may determine that user device 110 is a mobile device.

If the attachment request does not include the indicator (block 710—NO), process block 620 may include forwarding the attachment request to an MME device (block 720), receiving a response with a status of the user device from the MME device (block 730), and determining whether the user device is a stationary device based on the response with the status of the user device (block 740). For example, when base station 120 determines that attachment request 510 does not includes the indicator, base station 120 may forward attachment request 510 to MME device 160. Base station 120 may receive response 530 with the status of user device 110 from MME device 160 in response to attachment request 510. Base station 120 may determine whether user device 110 is a stationary device based on response 530. In one example, when response 530 includes the first predefined identifier (e.g., 0 or "STATIONARY"), base station 120 may determine that user device 110 is a stationary device. When response 530 includes the second predefined identifier (e.g., 1 or "MOBILE"), base station 120 may determine that user device 110 is a mobile device.

When base station 120 is unable to determine whether user device 110 is a stationary device or a mobile device, base station 120 may treat user device 110 as though user device 110 is a mobile device.

Returning to FIG. 6, if the user device is not a stationary device (block 620—NO), process 600 may include establishing a connection to the network via remote network components (block 625). For example, when base station 120 determines that user device 110 is a mobile device, base station 120 may establish connection 545 (FIG. 5B) between user device 110 and network 130 by using remote network components, including SGW 140, PGW 150, and/or MME device 160.

If the user device is a stationary device (block 620—YES), process 600 may include establishing a connection to the network via local components associated with the base station (block 630). For example, when base station 120 determines that user device 110 is a stationary device and is not used in a mobile manner, base station 120 may establish connection 540 between user device 110 and network 130 by using local components associated with base station 120. In one example, base station 120 may use eNB component 410, MME component 420, SGW component 430, and/or PGW component 440 to establish connection 540.

Process 600 may also include transmitting an attachment response to the user device (block 640). For example, after connection 545 (FIG. 5B) is established via the remote network components or after connection 540 is established via the local components associated with base station 120, base station 120 may generate attachment response 540. Attachment response 540 may indicate that user device 110 has been successfully connected to network 130.

Process 600 may also include forwarding traffic from/to the user device to/from the network (block 650). In one example, when connection 545 is established via the remote network components, base station 120 may forward traffic from/to user device 110 to/from network 130 via the remote network components, including SGW 140 and PGW 150. Alternatively, or additionally, when connection 540 is established via the local components associated with base station 120, base station 120 may forward traffic 560 from/to user device 110 to/from network 130 directly via base station 120 and/or the local components associated with base station 120.

Figure 8:
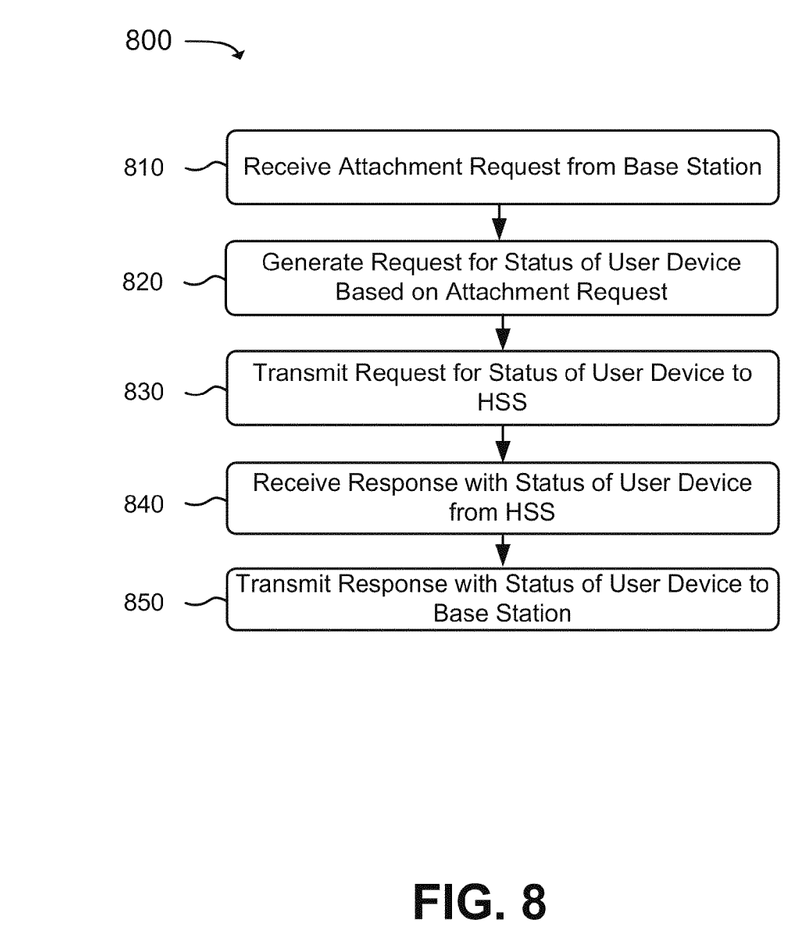
FIG. 8 is a flow chart of an example process for determining a status of the user device.

FIG. 8 is a flow chart of an example process 800 for determining a status of a user device. In one implementation, process 800 may be performed by MME device 160. Alternatively, or additionally, some or all of process 800 may be performed by another device or group of devices, including or excluding MME device 160.

As shown in FIG. 8, process 800 may include receiving an attachment request from a base station (block 810) and generating a request for a status of a user device based on the attachment request (block 820). For example, MME device 160 may receive attachment request 510 (FIG. 5A) from base station 120. Attachment request 510 may include an APN and/or an identifier (e.g., IMSI) associated with user device 110. MME device 160 may generate request 520 for a status of user device 110 based on attachment request 510. Request 520 may include the APN and/or the identifier associated with user device 110.

Process 800 may further include transmitting the request for the status of the user device to a HSS (block 830), receiving a response with the status of the user device from the HSS (block 840), and transmitting the response with the status of the user device to the base station (block 850). For example, MME device 160 may transmit request 520 to HSS 170. HSS 170 may store or have access to information that indicates which user devices 110 are stationary and which user devices 110 are mobile based on APNs and/or identifiers associated with the user devices. HSS 170 may determine identify a portion of the stored information that corresponds to the APN and/or the identifier that are included in request 520. HSS 170 may determine the status of user device 110 based on the portion of the stored information. The status of user device 110 may indicate whether user device 110 is stationary or not stationary (i.e., used in a mobile manner). HSS 170 may generate response 530 with the status of user device 110, and may transmit response 530 to MME device 160. MME device 160 may forward response 530 to base station 120. Base station 120 may determine whether use device 110 is a stationary device or a mobile device based on response 530.

Systems and/or methods described herein may allow a base station to determine whether an attachment request is from a user device that is a stationary device or a mobile device. When the base station determines that the user device is a stationary device, the base station may attach/connect the user device to a network by using local components that are part of the base station instead of using remote network resources, such as a SGW, a PGW, etc. With such an arrangement, a user of the user device may not have to wait until the user device is attached to the network via the remote network resources, and the remote network resources may not have to waste resources to establish a connection from the user device to the network.

The foregoing description of implementations provides illustration and description, but is not intended to be exhaustive or to limit the implementations to the precise form disclosed. Modifications and variations are possible in light of the above disclosure or may be acquired from practice of the implementations.

Furthermore, while series of blocks have been described with regard to FIGS. 6-8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a network device, an attachment request from a user device;
determining, by the network device, whether the attachment request includes a particular indicator that indicates whether the user device is a stationary device in a fixed location;
forwarding, by the network device, the attachment request when the attachment request does not include the particular indicator;
receiving, by the network device and when the attachment request does not include the particular indicator, a response based on forwarding the attachment request, the response including the particular indicator that indicates whether the user device is the stationary device;
determining, by the network device, whether the user device is the stationary device based on the particular indicator;
establishing, by the network device and when the user device is the stationary device, a connection between the user device and a network by using local components associated with the network device,
the local components performing functions performed by one or more of a remote mobility management entity (MME) device that is remote from the network device, a remote serving gateway (SGW) that is remote from the network device, or a remote packet data network (PDN) gateway (PGW) that is remote from the network device; and
transmitting, by the network device, traffic from the network to the user device via the local components associated with the network device after establishing the connection between the user device and the network.

2. The method of claim 1, where the local components are provided within or are directly connected to the network device.

3. The method of claim 1, further comprising:
establishing a different connection between the user device and the network by using the remote MME, the remote SGW, and the remote PGW when the user device is a mobile device; and
transmitting the traffic from the network to the user device via the network device, the remote MME, the remote SGW, and the remote PGW after establishing the different connection between the user device and the network.

4. The method of claim 1, where determining whether the user device is the stationary device includes:
determining whether the particular indicator matches a particular identifier, and
determining that the user device is the stationary device when the particular indicator matches the particular identifier.

5. The method of claim 1, where forwarding the attachment request includes:
forwarding the attachment request to the remote MME device.

6. The method of claim 1, further comprising:
generating, after establishing the connection between the user device and the network, another response that indicates that the user device is connected to the network; and
transmitting the other response to the user device.

7. A device comprising:
one or more processors to:
receive an attachment request from a user device,
determine that the attachment request does not include a particular indicator that indicates whether the user device is stationary,
transmit the attachment request to a remote mobility management entity (MME) device associated with the device based on determining that the attachment request does not include the particular indicator,
receive, from the remote MME device, a response that includes the particular indicator that indicates whether the user device is stationary,
determine that the user device is stationary based on the particular indicator included in the response,
attach the user device to a network by using local components associated with the device based on determining that the user device is stationary,
the local components performing functions performed by the remote MME device, and
transmit traffic between the network and the user device via the local components associated with the device after attaching the user device to the network.

8. The device of claim 7,
where the device is a base station, and
where the base station includes or is directly connected to the local components associated with the device.

9. The device of claim 7, where, when determining that the user device is stationary based on the response, the one or more processors are to:
determine that the particular indicator included in the response matches a particular identifier, and
determine that the user device is stationary based on determining that the particular indicator included in the response matches the particular identifier.

10. The device of claim 7, where the one or more processors are further to:
receive a different attachment request from a different user device,
determine whether the different user device is mobile based on the different attachment request,
attach the different user device to the network by using the remote MME device when the different user device is mobile, and
transmit traffic between the network and the different user device via the remote MME device after attaching the different user device to the network.

11. The device of claim 10, where, when determining whether the different user device is mobile, the one or more processors are to:
determine that the different attachment request includes another particular indicator,
determine whether the other particular indicator matches a particular identifier, and
determine that the different user device is mobile when the indicator matches the particular identifier.

12. The device of claim 10, where, when determining whether the different user device is mobile, the one or more processors are to:
determine whether the different attachment request includes another particular indicator that indicates whether the different user device is stationary,
transmit the different attachment request to the remote MME device when the different attachment request does not include the other particular indicator,
receive, from the remote MME device, a different response, and
determine that the different user device is mobile based on the different response.

13. A non-transitory computer-readable medium storing instructions, the instructions comprising:
one or more instructions that, when executed by one or more processors of a device, cause the one or more processors to:
receive an attachment request from a user device,
determine whether the attachment request includes an indicator that indicates whether the user device is stationary or mobile,
forward the attachment request when the attachment request does not include the indicator,
receive, when the attachment request does not include the indicator, a response based on forwarding the attachment request,
the response including the indicator,
determine that the user device is stationary based on the indicator,
establish, after determining that the user device is stationary, a connection between the user device and a cellular network by using local components associated with the device,
the local components performing functions performed by one or more of a remote mobility management entity (MME) device that is remote from the device, a remote serving gateway (SGW) that is remote from the device, or a remote packet data network (PDN) gateway (PGW) that is remote from the device, and
transmit, after establishing the connection between the user device and the cellular network, data between the cellular network and the user device via one or more of the local components associated with the device.

14. The non-transitory computer-readable medium of claim 13, further comprising:
one or more instructions that, when executed by the one or more processors of the device, cause the one or more processors to:
receive a different attachment request from a different user device,
determine that the different user device is mobile based on the attachment request, and
establish a different connection between the different user device and the cellular network by using the remote MME, the remote SGW, and the remote PGW after determining that the different user device is mobile.

15. The non-transitory computer-readable medium of claim 14, where the one or more instructions to determine that the different user device is mobile include:
one or more instructions to:
determine that the different attachment request does not include a different indicator that indicates whether the different user device is stationary or mobile,
transmit the attachment request to the remote MME after determining that the different attachment request does not include the different indicator,
receive another response from the remote MME, and
determine that the different user device is mobile based on the other response.

16. The non-transitory computer-readable medium of claim 13, where the local components are provided within or are directly connected to the device.

17. The non-transitory computer-readable medium of claim 13, where the one or more instructions to determine that the user device is stationary based on the indicator include:
one or more instructions to:
determine whether the indicator matches a particular identifier, and
determine that the user device is stationary when the indicator matches the particular identifier.

18. The non-transitory computer-readable medium of claim 13, where the particular indicator includes a numerical value.

19. The non-transitory computer-readable medium of claim 13, where the one or more instructions to forward the attachment request comprise:
one or more instructions that, when executed by the one or more processors, cause the one or more processors to:
forward the attachment request to the remote MME device for the remote MME device to request information regarding whether the user device is stationary from a home subscriber server (HSS).

20. The non-transitory computer-readable medium of claim 13,
where the device is a base station, and
where the local components are provided within or are directly connected to the device.

* * * * *